US009739234B2

(12) United States Patent
Schneider

(10) Patent No.: US 9,739,234 B2
(45) Date of Patent: *Aug. 22, 2017

(54) COMPLEX-SHAPED FORGED PISTON OIL GALLERIES

(71) Applicant: FEDERAL-MOGUL CORPORATION, Southfield, MI (US)

(72) Inventor: Norbert G. Schneider, Ann Arbor, MI (US)

(73) Assignee: Federal-Mogul LLC, Southfield, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,498

(22) Filed: Apr. 12, 2016

(65) Prior Publication Data
US 2016/0222913 A1 Aug. 4, 2016

Related U.S. Application Data

(63) Continuation of application No. 13/769,751, filed on Feb. 18, 2013, now Pat. No. 9,334,958.

(51) Int. Cl.
*F02F 3/28* (2006.01)
*F02F 3/00* (2006.01)
(Continued)

(52) U.S. Cl.
CPC .............. *F02F 3/285* (2013.01); *B21K 1/185* (2013.01); *F02F 3/003* (2013.01); *F02F 3/22* (2013.01);
(Continued)

(58) Field of Classification Search
CPC ...... F16J 1/005; F16J 1/006; F16J 1/01; F02F 3/0015; F02F 3/003; F02F 3/16;
(Continued)

(56) References Cited

U.S. PATENT DOCUMENTS 4,581,983 A 4/1986 Moebus
5,245,752 A 9/1993 Lippai et al.
(Continued)

FOREIGN PATENT DOCUMENTS

CN 1685143 A 10/2005
CN 101365559 A 2/2009
(Continued)

OTHER PUBLICATIONS

International Search Report, dated Jul. 3, 2017 (PCT/US2017/023501).

*Primary Examiner* — Grant Moubry
(74) *Attorney, Agent, or Firm* — Robert L. Stearns; Dickinson Wright, PLLC

(57) ABSTRACT

A steel piston with an oil gallery, and process for forming a steel piston oil gallery channel, which corresponds to the complex shape of the combustion bowl in the piston crown. The oil gallery channel is first forged to the basic shape that corresponds to the shape of the walls of the combustion bowl. Machine-turning surfaces in the oil gallery channel can be machine-finished as desired. Surfaces in the oil gallery which cannot be machined with conventional turning operations, such as recesses and protrusions into the channel, are left in the original forged condition.

21 Claims, 4 Drawing Sheets

(51) Int. Cl.
*F02F 3/22* (2006.01)
*F16J 1/08* (2006.01)
*B21K 1/18* (2006.01)
*F02F 3/26* (2006.01)

(52) U.S. Cl.
CPC ...... *F02F 3/26* (2013.01); *F16J 1/08* (2013.01); *F02F 2003/0061* (2013.01); *F02F 2200/04* (2013.01); *F05C 2201/0448* (2013.01); *Y10T 29/49249* (2015.01)

(58) Field of Classification Search
CPC ........ F02F 3/22; F02F 3/28; F02F 2003/0061; F02B 23/06; B21K 1/18; B21K 1/185; B23P 15/08; B23P 15/10
USPC ............ 123/193.6, 197.2; 92/172, 173, 186; 29/888.041, 888.042, 888.049
See application file for complete search history.

(56) References Cited

U.S. PATENT DOCUMENTS

| | | | |
|---|---|---|---|
| 6,286,477 B1 * | 9/2001 | Yang | F02B 23/104 123/263 |
| 6,474,220 B2 * | 11/2002 | Ries | B23P 15/10 29/558 |
| 6,588,396 B1 * | 7/2003 | Cleary | F02B 23/104 123/276 |
| 6,698,391 B1 | 3/2004 | Kemnitz | |
| 6,698,392 B1 | 3/2004 | Koehnert et al. | |
| 6,928,997 B2 | 8/2005 | Yu | |
| 6,938,603 B2 * | 9/2005 | Scharp | F02F 3/22 123/193.1 |
| 7,005,620 B2 | 2/2006 | Ribeiro et al. | |
| 7,104,183 B2 * | 9/2006 | Huang | B21K 1/18 29/888.04 |
| 7,185,614 B2 | 3/2007 | Meffert et al. | |
| 7,318,406 B2 | 1/2008 | Yi et al. | |
| 7,380,536 B2 * | 6/2008 | Issler | F02B 23/0621 123/276 |
| 7,971,568 B2 * | 7/2011 | Lee | F02B 17/005 123/193.6 |
| 7,987,831 B2 * | 8/2011 | Seifried | B23B 27/04 123/193.6 |
| 8,528,206 B2 * | 9/2013 | Scharp | B21K 1/185 123/193.6 |
| 8,789,273 B2 * | 7/2014 | Janssen | B23K 20/12 228/112.1 |
| 8,807,109 B2 * | 8/2014 | Muscas | F02F 3/003 123/193.6 |
| 8,943,687 B2 | 2/2015 | Scharp et al. | |
| 2005/0172926 A1 | 8/2005 | Poola et al. | |
| 2006/0207424 A1 * | 9/2006 | Gaiser | F02F 3/003 92/222 |
| 2008/0127818 A1 * | 6/2008 | Dye | B21K 1/18 92/186 |
| 2010/0218673 A1 | 9/2010 | Ribeiro | |
| 2010/0299922 A1 | 12/2010 | Gniesmer et al. | |
| 2011/0185889 A1 | 8/2011 | Muscas | |
| 2012/0222305 A1 | 9/2012 | Scharp et al. | |
| 2014/0230646 A1 | 8/2014 | Schneider | |

FOREIGN PATENT DOCUMENTS

| | | |
|---|---|---|
| CN | 101472705 A | 7/2009 |
| CN | 102395819 A | 3/2012 |
| CN | 202348466 U | 7/2012 |
| CN | 102667124 A | 9/2012 |
| DE | 102008011922 A1 | 9/2009 |
| EP | 2489848 A2 | 8/2012 |
| GB | 768992 A | 2/1957 |
| JP | 2006200505 A | 1/2006 |
| WO | 2011097205 A2 | 8/2011 |
| WO | 2014126736 A1 | 8/2014 |

* cited by examiner

COMPLEX-SHAPED FORGED PISTON OIL GALLERIES

CROSS-REFERENCE TO CO-PENDING APPLICATION

This U.S. Continuation Application claims the benefit of U.S. Utility application Ser. No. 13/769,751, filed Feb. 18, 2013 which is incorporated herein by reference in its entirety.

TECHNICAL FIELD

The invention relates generally to pistons for internal combustion engines, particularly diesel engines, and more particularly to pistons having oil galleries.

BACKGROUND

It is known in internal combustion engine applications, particularly with respect to diesel engines, to provide pistons with bodies formed with a closed gallery for cooling oil. The oil circulates through the gallery and cools parts of the piston which are susceptible to damage from the heat of combustion. The upper rims around the combustion bowls are particularly susceptible to damage when overheated.

The cooling galleries are generally annular or ring-shaped with constant cross-sections and are provided inside the piston ring belt and adjacent the top wall and rim of the piston body. The gallery is bounded by an inner wall adjacent the combustion bowl. The oil galleries can be either open or closed. If closed, the gallery channel is closed at the bottom by bottom wall. For closed galleries, inlets can be provided in the bottom wall for receiving cooling oil into the gallery, or the cooling oil could be supplied to the galleries by other means.

Traditionally, the combustion bowls of diesel engines have circular symmetric shapes and have smooth unbroken surfaces from the outer rims to the depressed center portions. Today, however, new bowls are being designed with non-traditional or complex shapes. It is understood that these non-traditional shapes are utilized in order to burn fuel more effectively and with less undesirable emissions. However, the complex bowl shapes makes the cooling of the howls and rims with conventional piston galleries more difficult. Conventional machining with turning operations will not provide oil galleries with similar or corresponding complex shapes as the complex shaped combustion bowls.

If the differences in structure between the combustion bowls and the oil galleries create walls with significantly different thicknesses, or walls which are too thick to be adequately cooled by the oil being circulated in the oil galleries, then "hot spots" in the piston can occur where the material can overheat. Hot spot areas can create weak spots in the piston where the material could crack or fail. If a piston fails, this creates an engine failure causing major expense and perhaps a new engine for the vehicle.

It is an object of the present invention to provide a forged steel oil gallery, and a method of forming a forged steel oil gallery, which accommodates non-traditional complex-shaped combustion bowls and maintains thin and uniform wall thickness in order to avoid overheating concerns.

SUMMARY OF THE INVENTION

The invention provides oil galleries for forged steel pistons with complex shaped combustion bowls, as well as methods for forming such oil galleries, which provide substantially uniform wall thickness between the combustion howls and the oil galleries. The invention minimizes or eliminates hot spots and allows the oil in the galleries to maintain the rims and other areas of the pistons and combustion bowls within acceptable temperature limits.

The galleries are formed in the same or substantially similar complex shapes as the combustion bowls. The galleries are formed by forging and then machined by conventional turning operations where possible to enlarge the galleries and to finish certain surfaces. Areas and surfaces in the galleries which cannot be finished by conventionally machine turning operations, such as recesses and bulges, are left in their initial forged condition. During the machine turning, an annular groove is formed extending the shape of the oil gallery in a direction toward the bowl rim.

The term "complex" as used herein refers to the shape of the combustion bowl in the piston crown which is not traditionally shaped, either in its outer perimeter, or inside the outer perimeter, or both. "Complex" shapes refers to all shapes of a combustion bowl other than traditional and which can have, for example, edges which include straight, curved, or arced sections, or which have bumps, protrusions, ribs, recesses and the like either in the bowl or, its outer perimeter, or both. In general, complex shapes are any shapes which are not machineable by conventional machine-turning operations.

The present invention is preferably utilized for pistons for diesel engines, although the invention can also be utilized for pistons for any internal combustion engine and for engines that use either liquid or gas fuel.

Once the crown of the piston if formed, the crown is attached to a second portion of the piston in order to complete the full piston. The second portion typically includes the remainder of the side walls and the pin bores. The crown and second portion are connected together in any known manner, but preferably by friction welding. A connection process of this type is disclosed, for example, in U.S. Pat. No. 6,260,472.

BRIEF DESCRIPTION OF THE DRAWINGS

These and other features and advantages of the present invention will become more readily appreciated when considered in connection with the following detailed description and appending drawings, wherein.

DESCRIPTION OF THE PREFERRED EMBODIMENTS

Figure 1:
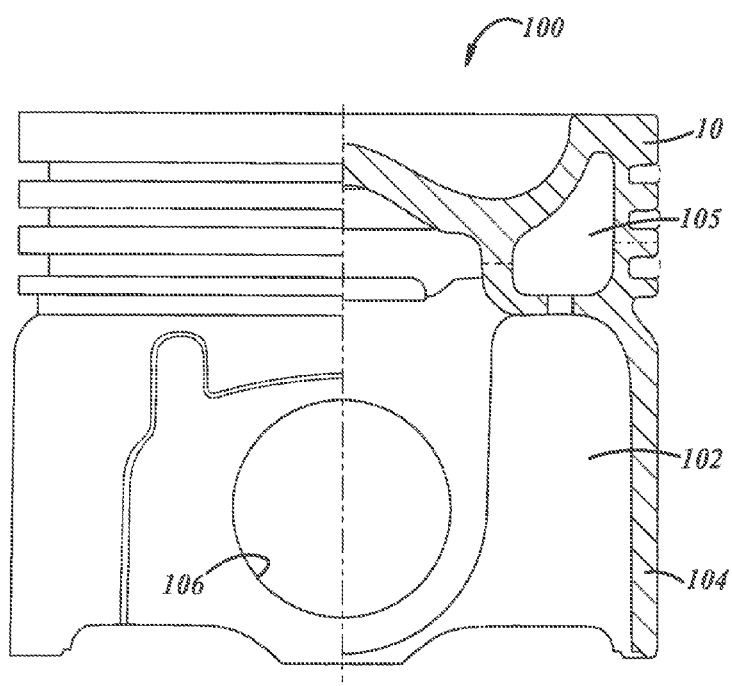
FIG. 1 illustrates a piston with a closed oil gallery.

A representative piston 100 in which the present invention can be utilized if the combustion bowl has a complex shape is shown in FIG. 1. The piston 100 includes a piston crown member 10 and a lower member 102 which includes side-walls 104 and pin bosses 106. The piston crown 10 and lower member 102 are fixedly secured together, preferably by friction welding, to form the complete piston 100.

The piston 100 has an oil gallery in which oil is circulated in order to maintain the temperature of the piston, particularly the upper surface, combustion bowl and outer rim within acceptable temperature limits. The oil gallery includes an oil gallery channel 105 positioned in the crown member 10. The oil gallery can be either opened or closed as well known in the art. If closed, the bottom wall of the oil gallery is typically included as part of the lower member 102.

Figure 3:
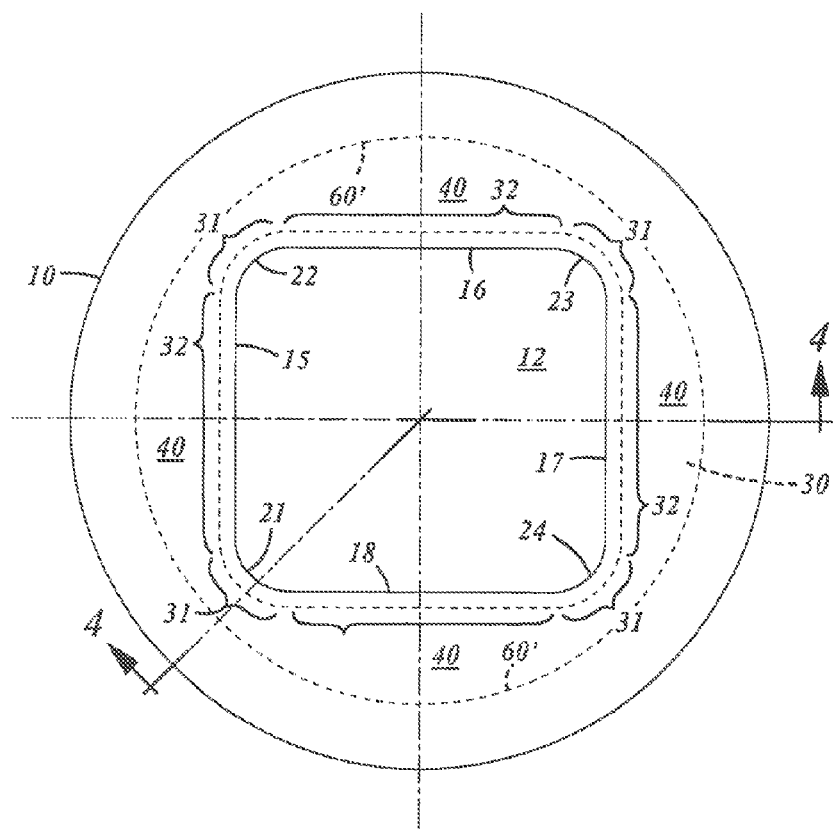
FIG. 3 is a schematic plan view of a piston crown depicting a representative complex shape of a combustion bowl.

A piston crown member 10 with a representative complex combustion bowl 12 is depicted in FIG. 3. The shape of the bowl 12 is essentially a square shape with four sides 15, 16, 17 and 18. In the shape depicted, the sides are straight with rounded corners 21, 22, 23 and 24.

It is to be understood that the shape of the combustion bowl and the linearity of the sides 15-18 is merely one example of a complex combustion bowl. In accordance with the invention, the combustion bowl can have any perimeter or internal shape, with any number of sides or side portions. The sides and internal surfaces can also have any shape, such as being straight as shown or curved or arced, and can have sections or portions which are straight, curved or arced, or have bumps, protrusions, recesses, ribs and the like. In addition, the corners 21-24, or the intersections or joints between the side portions, can have any shape, and can protrude into the bowl or be recessed from it.

Figure 2A:
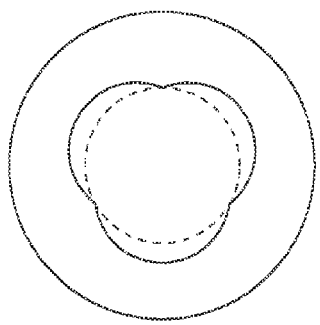
FIGS. 2A, 2B and 2C schematically illustrate three general types of complex combustion bowls.
Figure 2B:
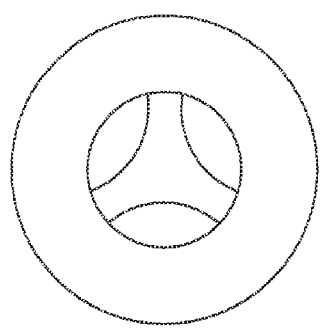
Figure 2C:
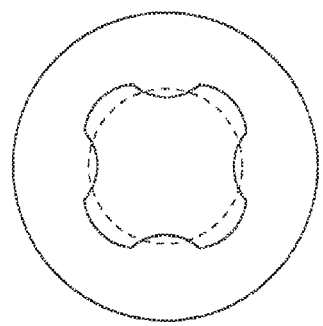

The shape of the piston bowl can be complex either in its outer periphery, as shown in FIG. 2A, be complex in the radially inner areas of the bowl, as shown in FIG. 2B, or be complex with respect to both the outer periphery and the inner areas as shown in FIG. 2C. FIGS. 2A, 2B and 2C are representative of these three general types of complex shaped combustion bowls. The present invention provides an oil gallery and oil gallery channel that can accommodate combustion bowls with such complex shapes.

The piston crown and the entire piston are made of a steel material. The shape of the piston crown 10 is formed by a forging process.

In accordance with a preferred embodiment of the invention, the oil gallery channel in the piston crown is made by the same process as the combustion bowl, or portions thereof. In the embodiment shown, the oil gallery channel is made by a forging process, followed by a machining process.

In accordance with a preferred embodiment, the forging die for forming the combustion bowl and the forging die for forming the oil gallery channel have corresponding shapes. The two dies have similar straight sections and similar curved sections that correspond to one another.

Figure 4:
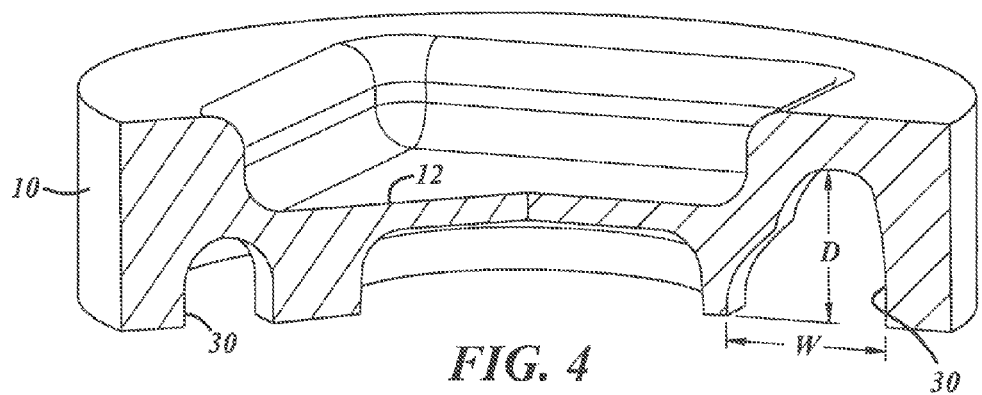
FIG. 4 is a cross-section of the piston crown as shown in FIG. 1 taken along line 4-4 and in direction of the arrows.

A cross-section of the piston crown 10 after the forging process is shown in FIG. 4. The forging process forms an annular groove 30 that does not necessarily have a circumferential uniform width "W" or a uniform depth "D". The width of the groove 30 is greater in the portions where the sides of the combustion bowl are furthest from the outside surface of the piston crown. These areas are designated by the numeral 40 in FIG. 3. Similarly, the areas where the groove 30 is the narrowest is at the corners or intersections between the side portions.

The depth D of the groove 30 made by the forging is dependent on the dies used in the forging process. There is a practical limit to the depth that forging dies can penetrate in a steel crown member and still be used repeatedly before they need replacing or refurbishing.

Figure 5:
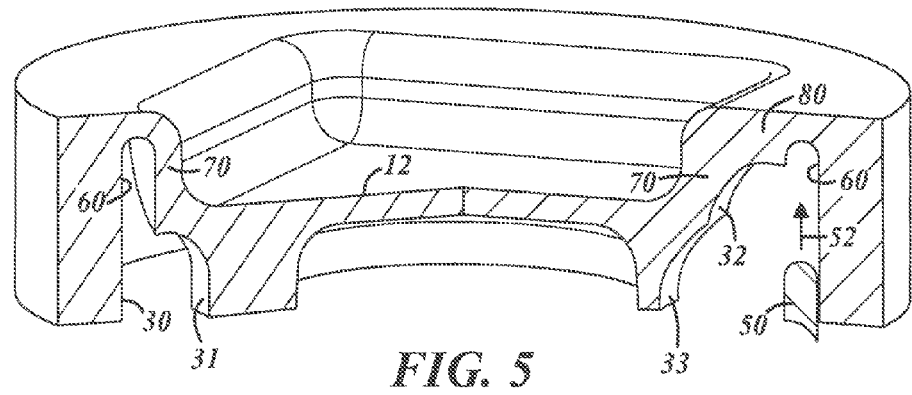
FIG. 5 is another cross-section of the piston crown similar to FIG. 4, following machining-turning of at least one surface of the oil gallery.

As a subsequent step in forming the oil galleries in accordance with a preferred embodiment of the invention, the shape of the oil gallery is machined to the shape shown in FIG. 5. In one step in the machine processing, a machining tool represented by the member 50 is inserted into the oil gallery 30 formed by the forging process (in the direction of arrow 52) and used to finish the outer surface of the oil gallery channel and to form an annular groove 60, entirely around the bowl. This machine-turning extends the oil gallery channel into the upper reaches of the piston crown (near the top ring groove and adjacent the top face or rim 80 of the piston). The groove 60, which is fully machined, extends above the initial channel 30 made in the forging process.

"Machine-turning" or simply "turning" is a machining process in which a cutting tool, typically a non-rotary tool bit, moves linearly while the workpiece rotates, such as on a lathe. "Mashing turning" can refer to such a cutting or finishing operation on either the internal surfaces or the external surfaces of a workpiece. In machining some of the surfaces of an oil gallery channel thereon, the machine-turning finishes or forms internal surfaces.

The machine-turning processing can also be used to machine and finish some of the inner surfaces of the oil gallery channel 30, such as surface 31. Due to the complex shape in the oil gallery in order to follow the complex shape of the combustion bowl, a plurality of bumps or recesses can be formed on the inside gallery surface by the forging die in the forging process. Due to the turning procedure used in the machining process, the recesses (or pocket portions) and areas between humps are left unfinished (i.e. not machined) in this step. Inner gallery channel surfaces 32 and 33 in FIG. 5 are not finished and remain in their original condition after forging.

In FIG. 3, the outer circumference of the finished annular groove 60 is indicated by hidden line 60'. In addition, an inner finished surface of the complex shaped oil gallery such as surface 31) is indicated by the hidden line 31. The areas (e.g. recesses) left unfinished are indicated by the reference numeral 32 in FIG. 3 and numerals 32 and 33 in FIG. 5. An oil gallery channel having the shape 30 shown in FIG. 4 can be formed by a forging die.

In a typical forging operation, the oil gallery channel in the lower surface of the piston crown member 10 will be formed at the same time that another forging die is forming the complex shaped combustion howl on the upper surface or upper side of the piston crown member.

The inventive process provides an annular oil gallery for a piston which has a similar or substantially the same perimeter inner shape as the outer perimeter shape of a complex-shaped combustion howl. This minimizes the thicknesses of the wall areas 70 between the oil gallery and combustion bowl 12 and makes the wall thicknesses around the outside of the combustion bowl uniform. Due to practical limits of the forging and machining processes, the thicknesses of all of the walls will not be exactly the same around the circumference of the combustion bowl. The present invention, however, makes the wall thickness 70 as thin and uniform as practical around the entire oil gallery. This allows oil introduced in the oil gallery when the piston is finished to maintain the temperature of the bowl wall surfaces and rim 80 within appropriate limits and avoids harmful hot spots.

With the present invention, thick wall sections which can create hot spots are minimized or eliminated. Areas of a piston which overheat (also called "hot spots") can create weak spots that could crack or fail. Failure of pistons in this manner could lead to expensive repairs, and possibly to the replacement of the engine.

Preferred cooling for a piston can be provided when the walls have a uniform thickness and are relatively thin. Pistons with thinner walls also have less weight which provides less strain on the engine. This results in better gas mileage and less harmful emissions.

Figure 6:
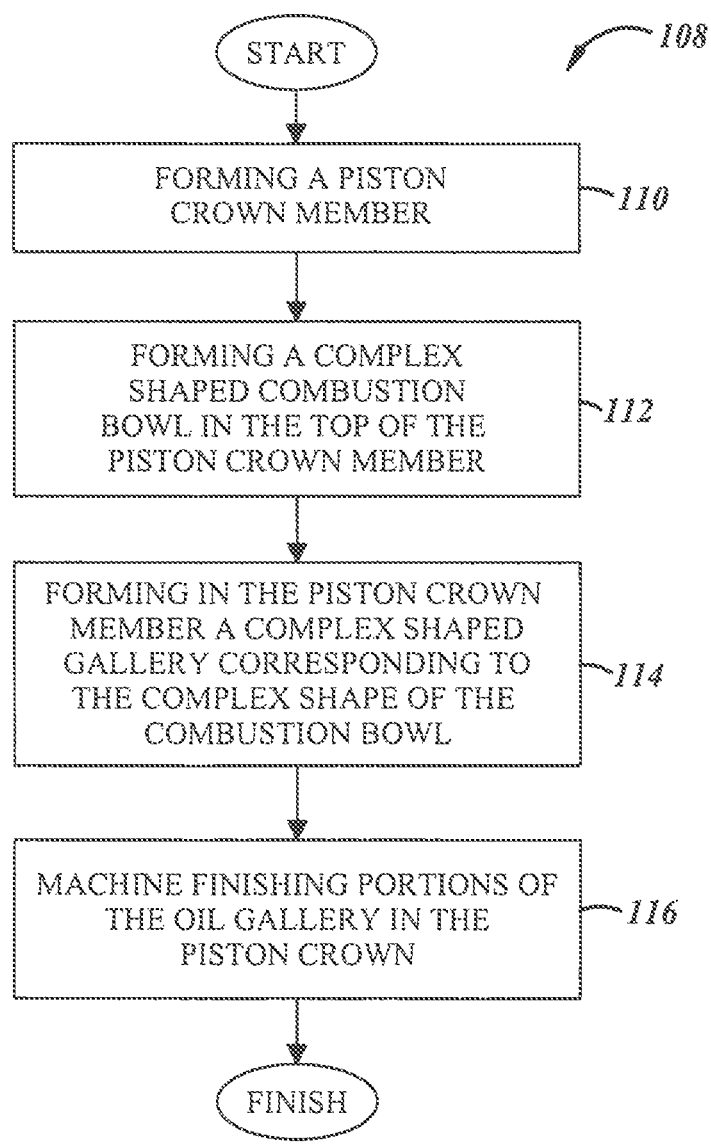
FIG. 6 is a flow chart of an embodiment of a system and method in accordance with the present invention.

FIG. 6 presents a flow chart 108 of the preferred method of forming an oil gallery channel in a piston crown that corresponds in shape to the shape of a complex combustion bowl in the piston crown. First, a piston crown member is made of a steel material 110. This can be done by any conventional manufacturing procedure.

Then, a complex shaped combustion bowl is formed in the top or upper surface of the piston crown member 112. This step is formed by a steel forging process.

At the same time or thereafter, an oil gallery channel 30 is formed in the lower surface or lower side of the piston crown member with a shape that is similar to, or corresponds to, the shape of the combustion bowl. This is shown in box 114. This step is also performed by a forging process, and preferably simultaneously with forging the bowl.

Finally, the oil gallery channel in the piston crown member is machine finished 116 to enlarge its size and bring it closer to the upper rim of the piston crown member and the combustion bowl. In this step, an annular groove 60 is formed by a cutting tool, and the other surfaces of the gallery channel which can be finished by a machine-turning operation (i.e. other than recesses and areas between bumps) can be finished as desired.

Although the invention has been described with respect to preferred embodiments, it is to be also understood that it is not to be so limited since changes and modifications can be made therein which are within the full scope of this invention as detailed by the following claims.

What is claimed is:

1. A piston comprising:
   a lower member, said lower member comprising sidewall portions and pin bores;
   an upper crown member joined to said lower member, said upper crown member being fabricated of steel and having a combustion bowl on an upper side thereof and an oil gallery channel on the lower side thereof, wherein said oil gallery channel includes a radially inner wail surface with at least one machine-turned wail surface portion and at least one non-machined pocket portion, said pocket portion being recessed radially inwardly of said machined-turned wall surface portion toward a longitudinal axis of the piston.

2. The piston as described in claim 1 wherein a plurality of said recessed non-machined pocket portions are provided, said pocket portions being spaced uniformly circumferentially in said oil gallery channel.

3. The piston as described in claim 1 wherein a plurality of said pocket portions are provided, said pocket portions being separated circumferentially from one another by intervening sections of machine-turned wall surface portions.

4. The piston as described in claim 1 wherein at least one of said machine-turned wall surface portions extends axially above said at least one pocket portion toward said upper side.

5. The piston as described in claim 1 wherein said oil gallery channel includes an outer wall portion that is entirely made up of a machine-turned wall surface portion.

6. The piston as described in claim 5 wherein said outer wall portion is the only wall surface portion in said oil gallery channel which is machine-turned in its entirety.

7. The piston as described in claim 5 wherein said machine-turned outer wall portion extends axially above said at least one pocket portion toward said upper side.

8. The piston as described in claim 1 wherein said oil gallery channel includes an uppermost region that is entirely made up of machine-turned wall surface portions.

9. The piston as described in claim 1 wherein said oil gallery channel is a portion of a closed oil gallery in the piston.

10. A piston comprising:
    a lower crown;
    an upper crown joined to said lower crown, said upper crown being fabricated of forged steel and having a combustion bowl of asymmetrical complex shape on an upper side thereof and an oil gallery channel on a lower side thereof, wherein said oil gallery channel includes a machine-turned wall surface portion in combination with at least one non-machined, as-forged pocket portion that is recessed relative to said machine-turned surface.

11. The piston as described in claim 10 wherein there is a section of said machine-turned wall surface portion that extends above said at least one pocket portion.

12. The piston as described in claim 10 comprising multiple pocket portions separated circumferentially from one another by intervening sections of said machine-turned wall surface portions.

13. The piston as described in claim 12 wherein there is a section of said machine turned wall surface portion that extends above all of said multiple pocket portions.

14. The piston as described in claim 10 wherein said oil gallery channel includes a radially outer wall portion that is entirely made up of a corresponding section of said machine-turned wall surface portion.

15. The piston as described in claim 10 wherein said oil gallery channel includes an uppermost region that is entirely made up of a corresponding section of said machine-turned all surface portion.

16. A piston for an internal combustion engine, comprising:
    a steel piston crown member having a complex shaped combustion bowl;
    an oil gallery channel in the piston crown member having a radially inner as forged wail surface with a shape corresponding substantially to the complex shape of the combustion bowl and machined portions of said inner wall surface having a different surface finish than that of said as-forged portions; and
    a lower piston member attached to said piston crown member, said lower piston member having sidewall members and pin bores.

17. The piston as described in claim 16 wherein surfaces in the forged oil gallery channel which can be machined by conventional machine-turning operations are machined.

18. The piston as described in claim 17 wherein forged surfaces which cannot be machined by conventional machine-turning operations are not machined and are left in a forged condition.

19. A method for forming an oil gallery channel in a steel piston crown member, said method comprising the steps of:
    providing a piston crown member made of a steel material;

forming a complex shaped combustion bowl in an upper surface of said piston crown member by a forging operation; and simultaneously forming a complex shaped oil gallery channel in a lower surface of said piston crown member by said forging operation, resulting in a shape of a radially inner wall surface of the oil gallery channel corresponding to the complex shape of the combustion bowl, and machining away portions of the inner wall surface of the oil gallery channel.

20. The method as described in claim 19 wherein said machined portion extends axially above said forged oil gallery channel.

21. The method as described in claim 19, wherein said oil gallery channel includes a radially outer wall surface that is entirely machined.

* * * * *